US012621656B2

(12) United States Patent
Hong

(10) Patent No.: US 12,621,656 B2
(45) Date of Patent: May 5, 2026

(54) CAPABILITY SENDING METHOD AND APPARATUS, AND CAPABILITY RECEIVING METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 322 days.

(21) Appl. No.: 18/272,096

(22) PCT Filed: Jan. 12, 2021

(86) PCT No.: PCT/CN2021/071337
§ 371 (c)(1),
(2) Date: Jul. 12, 2023

(87) PCT Pub. No.: WO2022/150989
PCT Pub. Date: Jul. 21, 2022

(65) Prior Publication Data
US 2024/0147221 A1 May 2, 2024

(51) Int. Cl.
*H04W 8/24* (2009.01)
*H04W 72/27* (2023.01)
*H04W 88/06* (2009.01)

(52) U.S. Cl.
CPC ............. *H04W 8/24* (2013.01); *H04W 72/27* (2023.01); *H04W 88/06* (2013.01)

(58) Field of Classification Search
CPC ... H04W 8/24; H04W 72/12; H04W 72/1215; H04W 88/06; H04W 36/0038; H04W 36/08; H04W 36/00; H04W 72/15
See application file for complete search history.

(56) References Cited

U.S. PATENT DOCUMENTS 9,474,105 B2 * 10/2016 Awoniyi-Oteri ...... H04W 88/06
11,259,219 B2 * 2/2022 Pan .................... H04W 36/0038
(Continued)

FOREIGN PATENT DOCUMENTS

CN      101583127 A  * 11/2009
CN      101583127 B  *  5/2011
(Continued)

OTHER PUBLICATIONS

C. Wu, R. Shi and K. Deng, "Reconnaissance and Experiment on 5G-SA Communication Terminal Capability and Identity Information," 2021 9th International Conference on Intelligent Computing and Wireless Optical Communications (ICWOC), Chongqing, China, 2021, pp. 16-22, doi: 10.1109/ICWOC52624.2021.953021 (Year: 2021).*

(Continued)

*Primary Examiner* — William D Cumming

(74) *Attorney, Agent, or Firm* — Arch & Lake LLP; Hao Tan; Shen Wang

(57) ABSTRACT

A capability sending method and apparatus, and a capability receiving method and apparatus are provided. The capability sending method includes: sending capability information of a terminal to a second base station; acquiring capability information of the second base station solving a multi-card problem; and sending the capability information for solving the multi-card problem to the terminal.

17 Claims, 6 Drawing Sheets

(56)  References Cited

U.S. PATENT DOCUMENTS

| | | | | |
|---|---|---|---|---|
| 2016/0219608 A1* | 7/2016 | Awoniyi-Oteri | ............................ | |
| | | | | H04W 72/1215 |
| 2016/0219648 A1* | 7/2016 | Awoniyi-Oteri | ........ | H04W 8/24 |
| 2020/0205045 A1* | 6/2020 | Pan | ................... | H04W 36/0038 |
| 2021/0212144 A1* | 7/2021 | Yang | ..................... | H04W 72/12 |
| 2022/0264405 A1* | 8/2022 | Hong | ................... | H04W 36/08 |
| 2024/0147221 A1* | 5/2024 | Hong | ................... | H04W 36/00 |

FOREIGN PATENT DOCUMENTS

| | | | | | |
|---|---|---|---|---|---|
| CN | 102413532 A | | 4/2012 | | |
| CN | 105719391 A | * | 6/2016 | .......... | G07F 7/0893 |
| CN | 103903022 B | * | 6/2017 | | |
| CN | 109041143 A | * | 12/2018 | ........ | H04W 36/0027 |
| CN | 109429283 A | * | 3/2019 | ........ | H04W 36/0027 |
| CN | 110495208 A | * | 11/2019 | ........ | H04W 52/0209 |
| CN | 110710262 A | | 1/2020 | | |
| CN | 211348281 U | * | 8/2020 | | |
| CN | 114667750 B | * | 10/2023 | .............. | H04W 8/24 |
| CN | 115088295 B | * | 8/2025 | .......... | H04W 72/27 |
| EP | 3672322 A1 | * | 6/2020 | .......... | H04W 36/08 |
| JP | 2020533843 A | * | 11/2020 | .......... | H04W 36/08 |
| WO | 2016028455 A1 | | 2/2016 | | |
| WO | WO-2016118248 A1 | * | 7/2016 | .............. | H04W 8/24 |
| WO | WO-2016118249 A1 | * | 7/2016 | ........ | H04W 72/1215 |
| WO | WO-2022150989 A1 | * | 7/2022 | .......... | H04W 36/00 |

OTHER PUBLICATIONS

International Search Report of PCT/CN2021/071337 dated Jul. 9, 2021 with English translation, (4p).

* cited by examiner

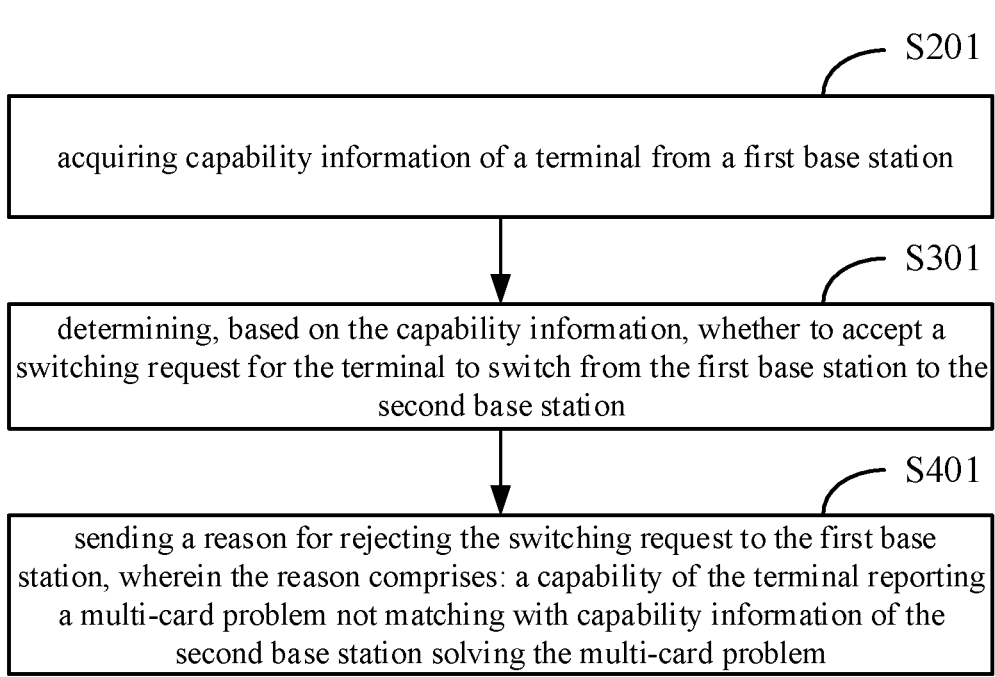

S201 acquiring capability information of a terminal from a first base station

S301 determining, based on the capability information, whether to accept a switching request for the terminal to switch from the first base station to the second base station

S401 sending a reason for rejecting the switching request to the first base station, wherein the reason comprises: a capability of the terminal reporting a multi-card problem not matching with capability information of the second base station solving the multi-card problem

FIG. 4

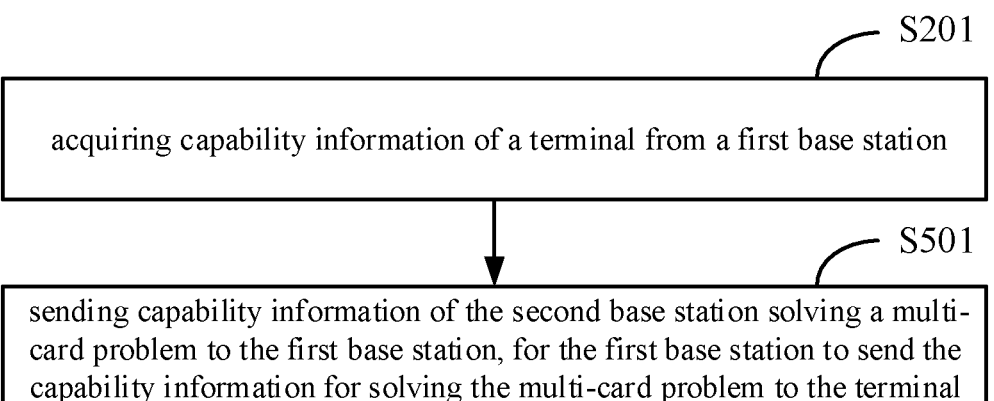

S201 acquiring capability information of a terminal from a first base station

S501 sending capability information of the second base station solving a multi-card problem to the first base station, for the first base station to send the capability information for solving the multi-card problem to the terminal

FIG. 5

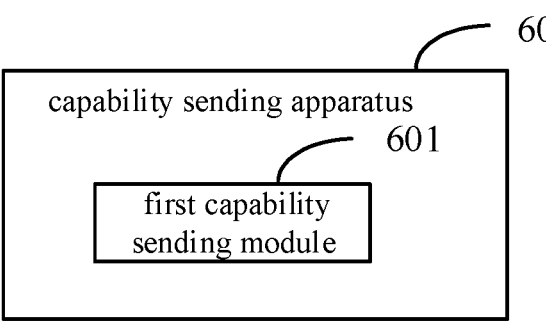

60 capability sending apparatus

601 first capability sending module

FIG. 6

CAPABILITY SENDING METHOD AND APPARATUS, AND CAPABILITY RECEIVING METHOD AND APPARATUS

CROSS REFERENCE

The present application is a U.S. National Stage of International Application No. PCT/CN2021/071337, filed on Jan. 12, 2021, the disclosure of which is incorporated herein by reference in its entirety for all purposes.

BACKGROUND

A terminal such as a cell phone may interact with a base station based on a SIM (Subscriber Identity Module) card. Commonly, the terminal can be a single-card terminal containing a single SIM card; or it can be a multi-card terminal containing multiple SIM cards, where the multiple SIM cards can belong to the same operator or different operators.

The terminal may have multi-card problems during operation, such as common multiple SIMS conflicts. For example, multiple SIM cards perform communication operations at the same time, resulting in insufficient performance. For example, when one SIM card executes communication operation, paging against another SIM card is received.

SUMMARY

The present disclosure relates to the field of communications, and in particular to cell selection methods, apparatus, and storage medium.

According to a first aspect of the present disclosure, there is provided a capability sending method, applied to a first base station, the method including: sending capability information of a terminal to a second base station.

According to a second aspect of the present disclosure, there is provided a capability receiving method, applied to a second base station, the method including: acquiring capability information of a terminal from a first base station.

According to a third aspect of the present disclosure, there is provided a capability sending method, applied to a terminal, the method including: sending capability information of the terminal to a first base station, for the first base station to send the capability information to a second base station.

According to a fourth aspect of the present disclosure, there is provided a capability sending apparatus, applied to a first base station, the apparatus including: a first capability sending module configured to send capability information of a terminal to a second base station.

According to a fifth aspect of the present disclosure, there is provided a capability receiving apparatus, applied to a second base station, the apparatus including: a capability receiving module configured to acquire capability information of the terminal from a first base station.

According to a sixth aspect of the present disclosure, there is provided a capability sending apparatus, applied to a terminal, the apparatus including: a second capability sending module configured to send capability information of the terminal to a first base station, for the first base station to send the capability information to a second base station.

According to a seventh aspect of the present disclosure, there is provided an electronic device, including: a processor; and a memory for storing instructions executable by the processor, wherein the processor is configured to implement the method of the first aspect, the second aspect, and/or the third aspect.

According to an eighth aspect of the present disclosure, there is provided a non-transitory computer readable storage medium having a computer program stored thereon, wherein the program implements steps in the method of the first aspect, the second aspect, and/or the third aspect when executed by a processor.

BRIEF DESCRIPTION OF THE DRAWINGS

In order to more clearly illustrate the technical solutions in the examples of the present disclosure, the following is a brief description of the accompanying drawings used in the description of the examples. It is obvious that the accompanying drawings in the following description are only some examples of the present disclosure, and other accompanying drawings can be acquired according to these accompanying drawings without any creative labor for a person of ordinary skill in the art.

FIG. 4 is a schematic flow diagram of a capability receiving method according to another example of the present disclosure.

FIG. 5 is a schematic flow diagram of a capability receiving method according to another example of the present disclosure.

FIG. 6 is a schematic block diagram of a capability sending apparatus according to an example of the present disclosure.

DETAILED DESCRIPTION

Examples of the present disclosure are described below in conjunction with the accompanying drawings. The examples described are only a portion of the examples of the present disclosure, and not all examples. Based on the examples in the present disclosure, all other examples acquired by a person of ordinary skill in the art without making creative labor fall within the scope of protection of the present disclosure.

When a terminal is accessed to a base station and transmits information, it is necessary to switch from the currently accessed base station to another base station for various reasons. For ease of description, the base station currently accessed by the terminal may be referred to as the first base station, and the base station to be switched to may be referred to as the second base station. For example, the location of the terminal may change, and move from the coverage cell of the first base station to the coverage cell of the second base station, then the terminal may switch from the first base station to the second base station to ensure the communication quality. Or, the terminal may be in a cell covered by both the first base station and the second base station, then the terminal may choose the better channel or switch between the first base station and the second base station to balance the service, etc.

When the terminal is accessed to the second base station, not only the channel quality of the second base station, but also other many factors need to be considered. For example, as for the multi-card terminal, the capability of the second base station to handle multi-card problems needs to be considered.

In view of this, examples of the present disclosure propose a capability sending method. In the method of this example, the first base station can also send the capability information of the terminal to the second base station, and the second base station can also receive the capability information of the terminal, to make better decisions, etc., so as to provide better user experience.

Figure 1:
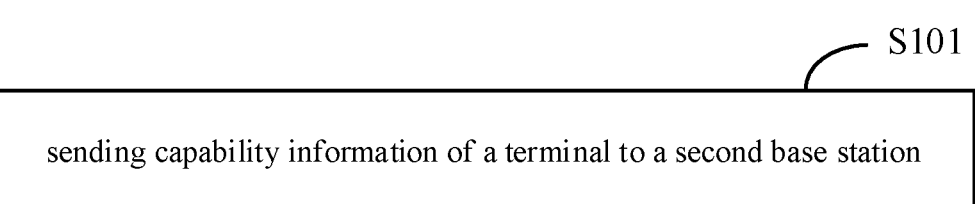
FIG. 1 is a schematic flow diagram of a capability sending method according to an example of the present disclosure.

FIG. 1 is a schematic flow diagram of a capability sending method according to an example of the present disclosure. The capability sending method shown in this example may be applicable to a base station. The base station includes but not limited to a 4G base station, a 5G base station, a 6G base station. The base station may be a first base station in the above example, for communicating with a terminal and a second base station in the above example. The base station may communicate with a terminal as a user device. The terminal includes, but not limited to, a cell phone, a tablet, a wearable device, a sensor, an IoT device, and other electronic devices.

As shown in FIG. 1, the capability sending method may include following step.

At step S101, capability information of a terminal is sent to a second base station. The terminal capability information may be used to identify capabilities of the terminal associated with multiple cards, such as a capability of the terminal supporting multiple cards, a capability of the terminal supporting reporting a multi-card problem, etc. In an example, the terminal may be a terminal to be switched (e.g., the terminal is a terminal to be switched from the first base station to the second base station).

In an example, the first base station may send the capability information of the terminal to the second base station. The first base station may acquire the capability information of the terminal, so as to send the capability information to the second base station when it is determined that the first base station needs to be switched to the second base station.

In one example, the first base station may acquire the capability information from the terminal. By way of example, the first base station may request to acquire the capability information from the terminal when it is determined that the terminal needs to switch to the second base station. Or, the first base station may request to acquire the capability information from the terminal when the terminal is accessed. Or, the terminal may also actively report the capability information to the first base station, such as reporting the capability information when it is accessed, or carrying its own capability information in the sent measurement report, etc.

In one example, the first base station may acquire the capability information of the terminal from the core network. For example, the terminal may send its own capability information to the core network in advance, so that the first base station may acquire the capability information of the terminal from the core network.

It is to be noted that, the above method of the first base station acquiring capability information of the terminal is only an example illustration, and this example does not specifically limit this. In addition, the timing of the first base station acquiring capability information may also be determined according to the actual situation, and this example does not limit it.

According to the above example, a first base station can send capability information of a terminal to a second base station, such that the second base station can make a better decision according to the capability information. For example, if the capability of the second base station itself does not match the capability information, accessing of the terminal can be rejected; or the second base station can also prompt the terminal that the capability information does not match, and the terminal decides by itself whether to perform accessing, etc., such that the terminal can be prevented from accessing a base station in which an abnormality easily occurs, thereby improving the user experience.

In an example, the first base station sending the capability information to the second base station may include:

sending to the second base station a switching request for the terminal to switch from the first base station to the second base station, wherein the switching request carries the capability information.

In an example, the capability information is used for the second base station to determine whether to accept the switching request for the terminal to switch from the first base station to the second base station.

In one example, the switching request may be a HANDOVER REQUEST signaling, which may be sent, for example, by modifying the UE Context Information information unit in such HANDOVER REQUEST signaling, or by adding a new information unit in the HANDOVER REQUEST signaling.

Based on this, in one example, the second base station may determine, based on this capability information, whether to accept the switching request for the terminal to switch from the first base station to the second base station.

According to the above example, as for the terminal to be switched from the first base station to the second base station, the first base station can directly carry the capability information of the terminal in the switching request, so that the second base station can directly respond to the switching request based on this capability information, which does not need to acquire the multi-card capability after the terminal is accessed, which not only improves the execution efficiency, but also avoids occurrence of anomalies after the terminal is accessed, and improves the user experience.

In an example, the capability information may include at least one of: a capability of the terminal supporting multiple cards; and a capability of the terminal reporting a multi-card problem, as described below in connection with a specific example. The capability of the terminal supporting multiple cards may include: the terminal supporting multiple cards, or the terminal not supporting multiple cards. If the terminal supports multiple cards, the capability information may further include: the number of SIM cards supported by the terminal, and the number may be, for example, 2, 3, etc.; and the network standard supported by each SIM card slot in the terminal, for example, supporting 3G, 4G, 5G, etc.

In an example, if the terminal supports multiple SIM cards, the terminal may have a multi-card problem. For example, communication operations corresponding to the first SIM card and the second SIM card conflict. In an example where the terminal is provided with a first SIM card and a second SIM card, the multi-card problem that may arise in the terminal may be one or more of the following: (i) the first SIM card monitoring paging messages conflicts with the second SIM card monitoring paging messages in the terminal; (ii) the communication operation of the first SIM card conflicts with the second SIM card monitoring paging messages in the terminal; (iii) the communication operation of the first SIM card conflicts with the second SIM card responding to paging messages in the terminal; (iv) the communication operation of the first SIM card conflicts with the second SIM card measuring signals in the terminal; (v) the communication operation of the first SIM card conflicts with the second SIM card receiving system information in the terminal; and (vi) the communication operation of the first SIM card conflicts with the second SIM card performing the tracking area updating in the terminal.

It should be noted that the above multi-card problem is only an example illustration, and other multi-card problems may occur in the terminal in practical applications, which will not be described here.

In an example, the capability of the terminal reporting a multi-card problem may be a multi-card problem that can be specifically reported by the terminal. For example, it may be one or more of the above multi-card problems that may occur at the terminal.

After receiving the capability information of the terminal, the second base station may determine whether to accept a switching request for the terminal to switch from the first base station to the second base station based on the capability information. As for different capability information, the method for the second base station to determine whether to accept the switching request may also be different, as described below in connection with specific examples.

The first example: the multi-card capability reported by the terminal includes the capability of the terminal supporting multiple cards. The capability that the terminal may report itself supporting multiple cards may be that the terminal supports multiple cards or that the terminal does not support multiple cards. Alternatively, in an example, in a case that the terminal supports multiple cards, the terminal may further report the number of SIM cards supported and the network standard, etc.

Based on this, in one example, the second base station may determine whether to accept the switching request based on the capability of the terminal supporting multiple cards, and the capability of the second base station supporting solving the multi-card problem. For example, the second base station accepts the switching request in response to that the terminal supports multiple cards, and the second base station supports solving the multi-card problem. Or, the second base station rejects the switching request in response to that the terminal supports multiple cards, and the second base station does not support solving the multi-card problem. Or, in response to that the terminal does not support multiple cards, and the second base station may determine that the terminal will not have a multi-card problem, and thus the second base station may accept the switching request.

In one example, the second base station may also predict possible multi-card problems at the terminal based on the capability of the terminal supporting multiple cards, such that the second base station determines whether to accept the switching request based on its own capability of supporting solving multi-card problems. For example, the second base station may determine the possible multi-card problems of the terminal based on the number of SIM cards supported by the terminal and/or the network standard supported by each SIM card slot. In this way, if the second base station supports solving the possible multi-card problems of the terminal, the second base station accepts the switching request of the terminal. If the second base station does not support solving the possible multi-card problems of the terminal, the second base station does not accept the switching request of the terminal.

The description of the first example is completed. According to the first example, the second base station can determine whether to accept the switching request of the terminal to switch to the second base station based on whether it has the capability to solve the multi-card problem, so that it can avoid the terminal accessing to the base station that does not support the multi-card problem, which reduces the probability of abnormal occurrence, and improves the user experience.

The second example: the capability information reported by the terminal includes the capability of the terminal reporting a multi-card problem. In the case that the terminal supports multiple cards, the capability information may further include the capability of reporting the multi-card problem, which may be, for example, the multi-card problem that the terminal is specifically capable of reporting, such as some or all of the problems that may occur at the terminal.

In a case that it is determined that the second base station supports solving the multi-card problem, the second base station may further determine whether to accept the switching request based on whether the capability of the terminal reporting a multi-card problem matches with capability information of the second base station solving the multi-card problem.

In an example, the second base station accepts the switching request in response to determining that the capability of the terminal reporting the multi-card problem matches with capability information of the second base station solving the multi-card problem. The second base station rejects the switching request in response to determining that the capability of the terminal reporting the multi-card problem does not match with capability information of the second base station solving the multi-card problem.

There are various methods for the second base station to determine whether the capability of the terminal reporting a multi-card problem matches with capability information of the second base station solving the multi-card problem. For example, if the capability of the terminal reporting the multi-card problem overlaps with the capability of the second base station solving the multi-card problem, the second base station determines that the two match. If the capability of the terminal reporting the multi-card problem completely does not overlap with the capability of the second base station solving the multi-card problem, the second base station determines that the two do not match.

That is, if the second base station can solve one or more problems that the terminal can report, it is determined that the two match. If the second base station cannot solve all the problems reported by the terminal, it is determined that the two do not match.

Alternatively, if the second base station can solve one or more problems that the terminal can report, it is determined that the two match. If the second base station cannot solve all the problems reported by the terminal, it is determined that the two do not match.

Alternatively, the capability of reporting a multi-card problem sent by the terminal also includes the priority of each multi-card problem, then the second base station may determine whether the capability of the terminal reporting a multi-card problem matches with capability information of the second base station solving the multi-card problem based on the priority. For example, if the second base station can solve the high priority multi-card problem, it determines that the two match. If the base station cannot solve the high priority multi-card problem, it determines that the two do not match, etc.

It is noted that the above method of determining whether the capability of the terminal reporting a multi-card problem matches with capability information of the second base station solving the multi-card problem is only an example illustration and is not specific limitation. In practical applications, it can also be determined according to other methods, which will not be repeated here.

The terminal may also report the possible multi-card problems of the terminal, so that the second base station may determine whether to accept the switching request of the terminal based on the possible multi-card problems of the terminal, and the multi-card problems that the terminal can report. If the second base station rejects the switch requesting for the terminal to switch from the first base station to the second base station, the second base station may also send a reason for rejecting the switching request to the first base station.

Based on this, in one example, the first base station may receive a reason for the second base station to reject the switching request for the terminal to switch from the first base station to the second base station. In an example, the reason includes: a capability of the terminal reporting a multi-card problem not matching with capability information of the second base station solving the multi-card problem.

In an example, the second base station may reject the switching request by HANDOVER REQUEST ACKNOWLEDGE or HANDOVER PREPARATION FAILURE signaling, and carry the reason for rejecting the switching request in such signaling.

As a result, the first base station can determine that the terminal fails to switch to the second base station because of mismatch of capability information, and thus corresponding processing can be carried out when switching of this terminal or other terminals is performed subsequently. For example, if the terminal requests to switch to the second base station again, the first base station may directly return to the terminal the mismatch of the capability information of the second base station solving the multi-card problem; or the first base station may directly reject the switching request of the terminal, etc.

The description of the second example is completed. According to the second example, it is possible to determine whether to accept the switching request of the terminal to switch to the second base station according to whether the second base station itself can solve the problems that the terminal can report, based on that the second base station supports solving the multi-card problems, so as to avoid that the multi-card problems that cannot be solved by this second base station occur after the terminal is accessed to the second base station, thereby ensuring stable operation of the terminal and improving the user experience.

In an example, the second base station sends capability information of the second base station solving a multi-card problem to the first base station. Based on this, the first base station can acquire the capability information of the second base station solving the multi-card problem, and send the capability information of solving a multi-card problem to the terminal.

As a result, the terminal may acquire capability information of the second base station solving a multi-card problem. In an example, the terminal may acquire capability information of a number of candidate base stations solving the multi-card problem by a similar method, so that it may determine which base station to access based on the capability information of each candidate base station solving a multi-card problem. For example, when it is determined that each candidate base station is capable of solving partial multi-card problems that may occur at the terminal, the terminal may determine to switch to the candidate base station capable of solving the most multi-card problems; or it may determine to switch to the candidate base station capable of solving high priority multi-card problems, etc. It should be noted that this is only an example illustration and not a specific limitation. The terminal may also make other decisions based on capability information of the second base station solving a multi-card problem, which will not be repeated here.

Figure 2:
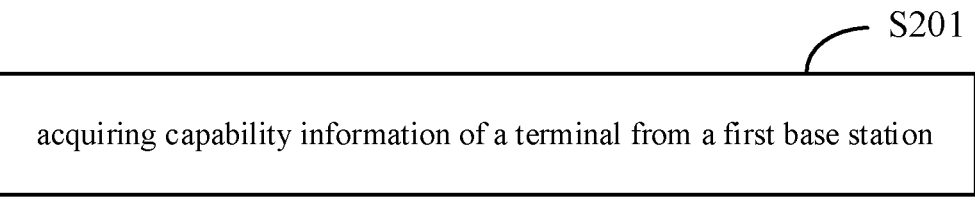
FIG. 2 is a schematic flow diagram of a capability receiving method according to an example of the present disclosure.

FIG. 2 is a schematic flow diagram of a capability receiving method according to an example of the present disclosure. The capability receiving method shown in this example may be applicable to a base station. The base station includes but not limited to a 4G base station, a 5G base station, a 6G base station. The base station may be the second base station in the above example, for communicating with the terminal and the first base station in the above example. The base station may communicate with a terminal as a user device. The terminal includes, but not limited to, a cell phone, a tablet, a wearable device, a sensor, an IoT device, and other electronic devices.

As shown in FIG. 2, the capability receiving method may include the following step.

At step S201, capability information of a terminal is acquired from a first base station. The terminal capability information may be used to identify capabilities of the terminal associated with multiple cards, such as a capability of the terminal supporting multiple cards; a capability of the terminal supporting reporting a multi-card problem, etc. The terminal may be a terminal to be accessed to the second base station. For example, the terminal may be a terminal to be switched, and the terminal is a terminal to be switched from the first base station to the second base station.

According to the example shown in FIG. 2, the second base station can receive the capability information of the terminal from the first base station, so as to make a better decision according to the capability information. For example, if the capability of the second base station itself does not match the capability information, accessing of the terminal can be rejected; or the second base station can also prompt the terminal that the capability information does not match, and the terminal decides by itself whether to perform accessing, etc., such that the terminal can be prevented from accessing a base station in which an abnormality easily occurs, thereby improving the user experience.

In one example, the first base station may carry the capability information of the terminal in the switching request sent to the second base station. Based on this, the second base station acquiring capability information of the terminal from the first base station includes: receiving a switching request for the terminal to switch from the first base station to the second base station sent by the first base station, wherein the switching request carries the capability information.

As a result, the second base station can directly respond to the switching request based on this capability information, which does not need to acquire the multi-card capability after the terminal is accessed, which not only improves the execution efficiency, but also avoids occurrence of anomalies after the terminal is accessed, and improves the user experience.

Figure 3:
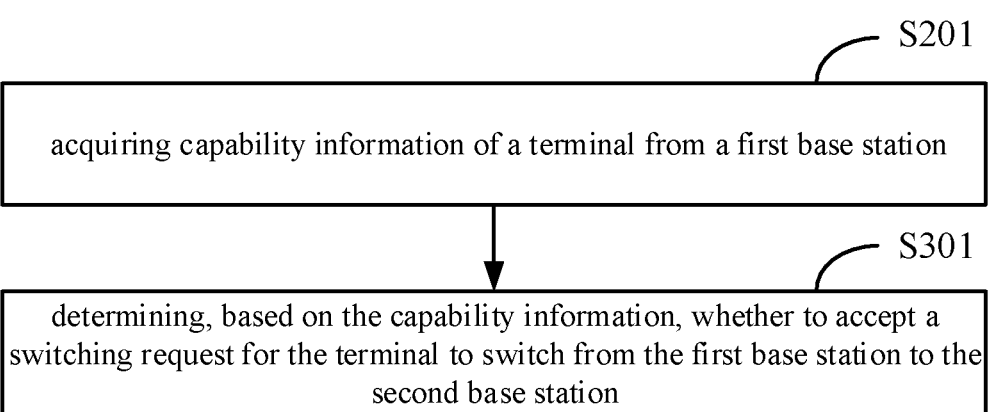
FIG. 3 is a schematic flow diagram of a capability receiving method according to another example of the present disclosure.

FIG. 3 is a schematic flow diagram of a capability sending method according to an example of the present disclosure. As shown in FIG. 3, the method further includes the following step.

At step S301, based on the capability information, it is determined whether to accept a switching request for the terminal to switch from the first base station to the second base station. The capability information includes at least one of: a capability of the terminal supporting multiple cards; a capability of the terminal reporting a multi-card problem.

If the capability information sent by the terminal includes the capability of the terminal supporting multiple cards, the second base station determines whether to accept the switching request for the terminal to switch from the first base station to the second base station based on the capability information that may include one or more of: accepting the switching request in response to determining that the terminal supports multiple cards and the second base station supports solving the multi-card problem; and rejecting the switching request in response to determining that the terminal supports multiple cards and the second base station does not support solving the multi-card problem.

In the case that the terminal supports multiple cards, the capability information, sent by the terminal, may include the capability of the terminal reporting the multi-card problem, which may be, for example, the multi-card problem that the terminal is specifically capable of reporting, such as some or all of the problems that may occur at the terminal. Based on this, the second base station determines whether to accept the switching request for the terminal to switch from the first base station to the second base station based on the capability information that may include one or more of: accepting the switching request in response to determining that the capability of the terminal reporting the multi-card problem matches with capability information of the second base station solving the multi-card problem; and rejecting the switching request in response to determining that the capability of the terminal reporting the multi-card problem does not match with capability information of the second base station solving the multi-card problem.

There are various methods for the second base station to determine whether the capability of the terminal reporting a multi-card problem matches with capability information of the second base station solving the multi-card problem.

For example, the capability of the terminal reporting the multi-card problem matching with capability information of the second base station solving the multi-card problem includes: the capability of the terminal reporting the multi-card problem overlapping with the capability of the second base station solving the multi-card problem. The capability of the terminal reporting the multi-card problem not matching with capability information of the second base station solving the multi-card problem includes: the capability of the terminal reporting the multi-card problem completely not overlapping with the capability of the second base station solving the multi-card problem.

Here, the second base station may also determine whether the capability of the terminal reporting a multi-card problem matches with capability information of the second base station solving the multi-card problem by other methods, as can be seen in the example on the first base station side, which will not be repeated here.

FIG. 4 is a schematic flow diagram of a capability sending method according to an example of the present disclosure. As shown in FIG. 4, the method further includes the following step.

At step S401, a reason for rejecting the switching request is sent to the first base station, wherein the reason includes: a capability of the terminal reporting a multi-card problem not matching with capability information of the second base station solving the multi-card problem.

As a result, the first base station can determine that the terminal fails to switch to the second base station because of mismatch of capability information, and thus corresponding processing can be carried out when switching of this terminal or other terminals is performed subsequently. For example, if the terminal requests to switch to the second base station again, the first base station may directly return to the terminal the mismatch of the capability information of the second base station solving the multi-card problem; or the first base station may directly reject the switching request of the terminal, etc.

FIG. 5 is a schematic flow diagram of a capability sending method according to an example of the present disclosure. As shown in FIG. 5, the method further includes the following step.

At step S501, capability information of the second base station solving a multi-card problem is sent to the first base station, for the first base station to send the capability information for solving the multi-card problem to the terminal.

As a result, the terminal may acquire capability information for the second base station to solve the multi-card problem. In an example, the terminal may acquire capability information of switchable candidate base stations solving the multi-card problem, so that it may determine which base station to access based on the capability information of each candidate base station solving the multi-card problem, as can be seen in the example shown for the first base station, which will not be repeated here.

An example of the present disclosure also illustrates a capability sending method that may be applicable to a terminal, the terminal including, but not limited to, an electronic device such as a cell phone, a tablet, a wearable device, a sensor, an IoT device, etc. The terminal may communicate with a base station as a user device, the base station including, but not limited to, a 4G base station, a 5G base station, a 6G base station. In an example, the base station may be a first base station and/or a second base station as described in any of the above examples.

In an example, the capability sending method includes: sending capability information of the terminal to a first base station, for the first base station to send the capability information to a second base station.

In an example, the terminal capability information may be used to identify capabilities of the terminal associated with multiple cards, such as a capability of the terminal support-ing multiple cards; a capability of the terminal supporting reporting a multi-card problem, etc.

In an example, the terminal may directly send the capa-bility information to the first base station, for example, it may actively report the capability information to the first base station, or it may also return the capability information to the first base station based on a request from the first base station.

In an example, the terminal may forward the capability information to the first base station via the core network. For example, the terminal may send the capability information to the core network, so that the first base station may acquire the capability information of the terminal from the core network. The first base station may send this capability information to the second base station. The capability infor-mation is used for the second base station to determine whether to accept the switching request for the terminal to switch from the first base station to the second base station.

Here, the method for the second base station to determine whether to accept the switching request may be referred to the above-mentioned examples on the first base station side and on the second base station side, and will not be described herein.

In an example, the capability information includes at least one of: a capability of the terminal supporting multiple cards; a capability of the terminal reporting a multi-card problem.

In an example, the capability of the terminal supporting multiple cards may include: the terminal supporting multiple cards, or the terminal not supporting multiple cards. Alter-natively, if the terminal supports multiple cards, the capa-bility information may include: the number of SIM cards supported by the terminal and/or the network standard supported by each SIM card slot in the terminal, etc.

In an example, if the terminal supports multiple SIM cards, the terminal may have a multi-card problem. For example, communication operations corresponding to the first SIM card and the second SIM card conflict. Based on this, the capability of the terminal reporting a multi-card problem may be a multi-card problem that can be specifi-cally reported by the terminal. For example, it may be one or more of the above multi-card problems that may occur at the terminal. The possible multi-card problems of the ter-minal may be referred to the first base station side example described above and will not be described herein.

In one example, the capability sending method further includes: receiving capability information for the second base station to solve the multi-card problem sent by the first base station.

In an example, the second base station sends capability information of the second base station solving a multi-card problem to the first base station. The first base station can acquire the capability information of the second base station solving the multi-card problem, and send the capability information of solving a multi-card problem to the terminal. As a result, the terminal may acquire capability information of the second base station solving a multi-card problem. In an example, the terminal may acquire capability information of a number of candidate base stations solving the multi-card problem by a similar method, so that it may determine which base station to access based on the capability information of each candidate base station solving a multi-card problem. For example, when it is determined that each candidate base station is capable of solving partial multi-card problems that may occur at the terminal, the terminal may determine to switch to the candidate base station capable of solving the most multi-card problems; or it may determine to switch to the candidate base station capable of solving high priority multi-card problems, etc. It should be noted that this is only an example illustration and not a specific limitation. The terminal may also make other decisions based on capability information of the second base station solving a multi-card problem, which will not be repeated here.

The introduction of the example of the capability sending method applied to the terminal is completed, and it is only briefly described here, and the specific implementation can be referred to the implementation at the first base station side and the second base station side. According to the capability sending method in this example, the second base station can acquire the capability information of the terminal, so as to make a better decision, and thus the terminal can be pre-vented from accessing a base station in which an abnormal-ity easily occurs, thereby improving the operation stability of the terminal, and improving the user experience.

Corresponding to the aforementioned example of the capability sending method, the present disclosure also pro-vides an example of a capability sending apparatus.

FIG. 6 is schematic block diagram of a capability sending apparatus according to an example of the present disclosure. The capability sending apparatus shown in this example may be applicable to a base station. The base station includes but not limited to a 4G base station, a 5G base station, a 6G base station. The base station may be a first base station in the above example, for communicating with a terminal and a second base station in the above example. The base station may communicate with a terminal as a user device. The terminal includes, but not limited to, a cell phone, a tablet, a wearable device, a sensor, an IoT device, and other electronic devices.

As shown in FIG. 6, the capability sending apparatus includes: a first capability sending module 601 configured to send capability information of a terminal to a second base station.

In an example, the terminal is a terminal to be switched from the first base station to the second base station.

Figure 7:
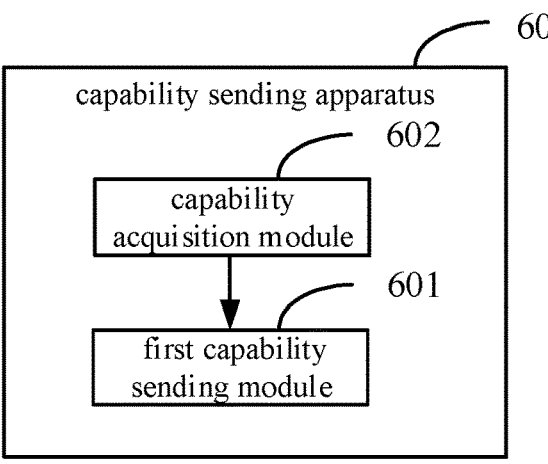
FIG. 7 is a schematic block diagram of a capability sending apparatus according to an example of the present disclosure.

FIG. 7 is schematic block diagram of a capability sending apparatus according to an example of the present disclosure. As shown in FIG. 7, the capability sending apparatus further includes: a capability acquisition module 602 configured to acquire the capability information of the terminal. In one example, the capability acquisition module 602 is config-ured to: acquire the capability information from the termi-nal. In one example, the capability acquisition module 602 is configured to: acquire the capability information of the terminal from a core network.

In an example, a first capability sending module 601 is configured to: send to the second base station a switching request for the terminal to switch from the first base station to the second base station, wherein the switching request carries the capability information.

In an example, the capability information is used for the second base station to determine whether to accept the switching request for the terminal to switch from the first base station to the second base station.

In an example, the capability information includes at least one of: a capability of the terminal supporting multiple cards; and a capability of the terminal reporting a multi-card problem.

Figure 8:
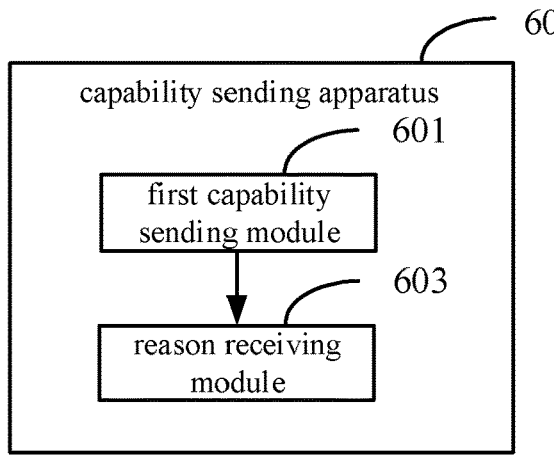
FIG. 8 is a schematic block diagram of a capability sending apparatus according to another example of the present disclosure.

FIG. 8 is a schematic block diagram of a capability sending apparatus illustrated in accordance with another example of the present disclosure. As shown in FIG. 8, the capability sending apparatus further includes: a reason receiving module 603 configured to receive a reason for the second base station to reject the switching request for the terminal to switch from the first base station to the second base station, wherein the reason includes: a capability of the terminal reporting a multi-card problem not matching with capability information of the second base station solving the multi-card problem.

Figure 9:
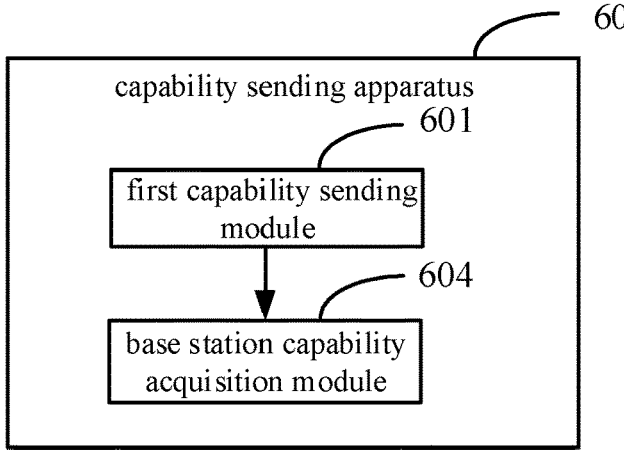
FIG. 9 is a schematic block diagram of a capability sending apparatus according to another example of the present disclosure.

FIG. 9 is a schematic block diagram of a capability sending apparatus illustrated in accordance with another example of the present disclosure. As shown in FIG. 9, the capability sending apparatus further includes: a base station capability acquisition module 604 configured to acquire capability information of the second base station solving a multi-card problem; send the capability information for solving the multi-card problem to the terminal.

With respect to the apparatus in the above-described example, the specific manner in which the individual modules perform their operations has been described in detail in the example of the relevant method, and will not be described in detail herein.

Corresponding to the aforementioned examples of the capability receiving method, the present disclosure also provides examples of the capability receiving apparatus.

Figure 10:
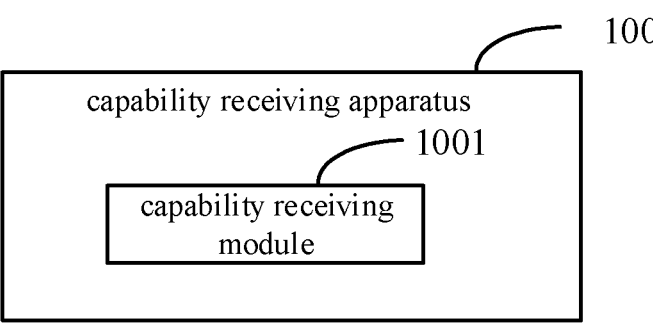
FIG. 10 is a schematic block diagram of a capability receiving apparatus according to an example of the present disclosure.

FIG. 10 is a schematic flow diagram of a capability receiving apparatus according to an example of the present disclosure. The capability receiving apparatus shown in this example may be applicable to a base station. The base station includes but not limited to a 4G base station, a 5G base station, a 6G base station. The base station may be the second base station in the above example, for communicating with the terminal and the first base station in the above example. The base station may communicate with a terminal as a user device. The terminal includes, but not limited to, a cell phone, a tablet, a wearable device, a sensor, an IoT device, and other electronic devices.

As shown in FIG. 10, the apparatus may include: a capability receiving module 1001 configured to acquire capability information of a terminal from a first base station.

In an example, the terminal is a terminal to be switched from the first base station to the second base station.

In an example, the capability receiving module 1001 is configured to: receive a switching request for the terminal to switch from the first base station to the second base station sent by the first base station, wherein the switching request carries the capability information.

Figure 11:
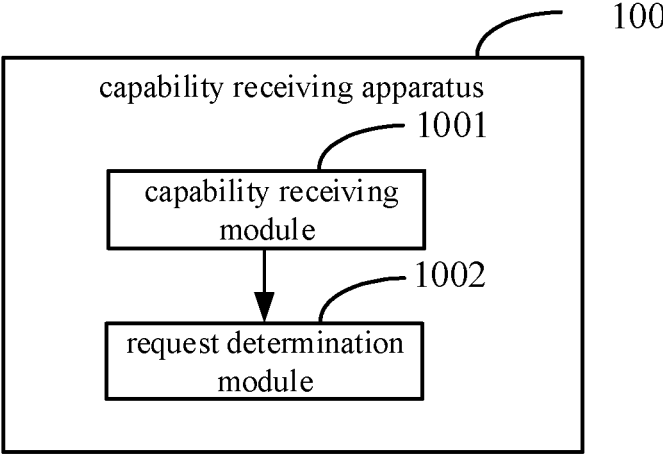
FIG. 11 is a schematic block diagram of a capability receiving apparatus according to another example of the present disclosure.

FIG. 11 is a schematic flowchart of a capability receiving apparatus illustrated according to an example of the present disclosure. As shown in FIG. 11, the apparatus may include: a request determination module 1002 configured to determine, based on the capability information, whether to accept a switching request for the terminal to switch from the first base station to the second base station.

In one example, the capability information includes at least one of: a capability of the terminal supporting multiple cards; a capability of the terminal reporting a multi-card problem.

In an example, the request determination module 1002 is configured to: accept the switching request in response to determining that the terminal supports multiple cards and the second base station supports solving the multi-card problem; reject the switching request in response to determining that the terminal supports multiple cards and the second base station does not support solving the multi-card problem.

In an example, the request determination module 1002 is configured to: accept the switching request in response to determining that the capability of the terminal reporting the multi-card problem matches with capability information of the second base station solving the multi-card problem;

reject the switching request in response to determining that the capability of the terminal reporting the multi-card problem does not match with capability information of the second base station solving the multi-card problem.

In one example, the capability of the terminal reporting the multi-card problem matching with capability information of the second base station solving the multi-card problem includes: the capability of the terminal reporting the multi-card problem overlapping with the capability of the second base station solving the multi-card problem;

The capability of the terminal reporting the multi-card problem not matching with capability information of the second base station solving the multi-card problem includes: the capability of the terminal reporting the multi-card problem completely not overlapping with the capability of the second base station solving the multi-card problem.

In an example, the request determination module 1002 is further configured to: send a reason for rejecting the switching request to the first base station, wherein the reason includes: a capability of the terminal reporting a multi-card problem not matching with capability information of the second base station solving the multi-card problem.

Figure 12:
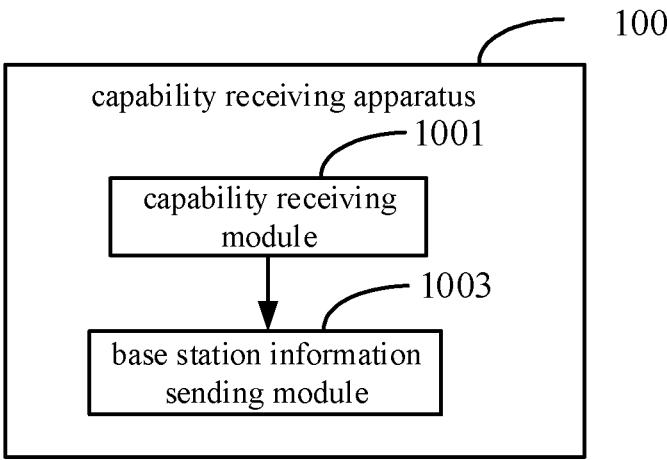
FIG. 12 is a schematic block diagram of a capability receiving apparatus according to another example of the present disclosure.

FIG. 12 is a schematic flowchart of a capability receiving apparatus illustrated according to an example of the present disclosure. As shown in FIG. 12, the apparatus may further include: a base station information sending module 1003 configured to send capability information of the second base station solving a multi-card problem to the first base station, for the first base station to send the capability information for solving the multi-card problem to the terminal.

With respect to the apparatus in the above-described example, the specific manner in which the individual modules perform their operations has been described in detail in the example of the relevant method, and will not be described in detail herein.

Corresponding to the aforementioned examples of the capability sending method, the present disclosure also provides examples of the capability sending apparatus.

Figure 13:
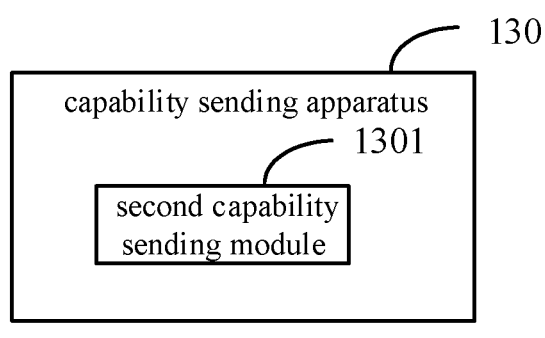
FIG. 13 is a schematic block diagram of a capability sending apparatus according to an example of the present disclosure.

FIG. 13 is a schematic block diagram of a capability sending apparatus illustrated in accordance with an example of the present disclosure. The capability sending apparatus shown in this example may be applicable to a terminal, the terminal including, but not limited to, a cell phone, a tablet, a wearable device, a sensor, an IoT device, and other electronic devices. The terminal may communicate with a base station as a user device, the base station including, but not limited to, a 4G base station, a 5G base station, a 6G base station. In one example, the base station may be a first base station and/or a second base station as described in any of the preceding examples.

As shown in FIG. 13, the apparatus includes: a second capability sending module 1301 configured to send capability information of the terminal to a first base station, for the first base station to send the capability information to a second base station. The capability information is used for the second base station to determine whether to accept the switching request for the terminal to switch from the first base station to the second base station.

In an example, the capability information includes at least one of: a capability of the terminal supporting multiple cards; a capability of the terminal reporting a multi-card problem.

In an example, the second capability sending module 1301 is further configured to receive capability information for the second base station to solve the multi-card problem sent by the first base station.

With respect to the apparatus in the above example, the specific manner in which the individual modules perform their operations has been described in detail in the example of the relevant method and will not be described in detail herein.

For the apparatus example, since it basically corresponds to the method example, the relevant part may refer to the description of the method example. The apparatus examples described above are merely schematic, where the modules described as separate components may or may not be physically separated, and the components shown as modules may or may not be physical modules, i.e., they may be located in one place or may be distributed over multiple network modules. Some or all of these modules can be selected according to practical needs to achieve the purpose of the technical solution of this example. It can be understood and implemented by a person of ordinary skill in the art without creative labor.

Specific capability sending mechanisms and capability receiving mechanisms according to the present disclosure are described below in general in conjunction with specific technical details, as follows.

The target base station may know the possible multi-card problems faced by the UE to be switched through the source base station, and thus may make a targeted decision on whether to receive the switching for the UE.

The source base station sends to the target base station the multi-card capability and/or the capability of reporting the multi-card problem that can be supported by the multi-card terminal to be switched.

A method for a source base station to acquire the multi-card capability and/or the capability of reporting the multi-card problem that can be supported by the multi-card terminal includes following steps:

The base station acquires the multi-card capability and/or the capability of reporting the multi-card problem that can be supported by the multi-card terminal through reporting of the multi-card terminal.

The base station acquires the multi-card capability and/or the capability of reporting the multi-card problem that can be supported by the multi-card terminal via the core network.

The source base station may send the multi-card capability and/or the capability of reporting the multi-card problem that can be supported by the multi-card terminal to be switched, when sending a switching request to the target base station. Specifically, the multi-card capability and/or the capability of reporting the multi-card problem may be sent in HANDOVER REQUEST signaling. More specifically, it may be sent by modifying the UE Context Information information unit in such HANDOVER REQUEST signaling, or by adding a new information unit in the HANDOVER REQUEST signaling.

After receiving the multi-card capability and/or the capability of reporting the multi-card problem that can be supported by the multi-card terminal to be switched sent from the source base station, the target base station determines, based on the received information, whether to receive a switching request of the multi-card terminal to be switched.

For example, if the received information contains the multi-card capability that can be supported by the multi-card terminal to be switched, the target base station may determine whether to receive it based on whether the target base station itself has the capability to solve the multi-card terminal problem, and may also return to the source base station the capability of solving the multi-card terminal problem supported by the target base station at the same time.

If the received information contains the capability of reporting the multi-card problem that can be supported by the multi-card terminal to be switched, the target base station may determine whether to receive it based on the capability of solving the multi-card terminal problem specifically supported by the target base station itself, and may also return to the source base station the capability of solving the multi-card terminal problem supported by the target base station at the same time.

The target base station may be sent via HANDOVER REQUEST ACKNOWLEDGE/HANDOVER PREPARATION FAILURE signaling. If the switching fails, the reason for the failed switching can also be sent at the same time, e.g. the target base station does not support the multi-card problem of the multi-card terminal to be switched.

After receiving the capability information of solving the multi-card terminal problem supported by the target base station, the source base station sends the information to the multi-card terminal to be switched.

An example of the present disclosure further present an electronic device including: a processor; and a memory for storing instructions executable by the processor, wherein the processor is configured to implement the above capability sending method and/or the capability receiving method.

An example of the present disclosure further provides a computer readable storage medium having a computer program stored thereon, wherein the program implements steps in the above capability sending method and/or the capability receiving method when executed by a processor.

Figure 14:
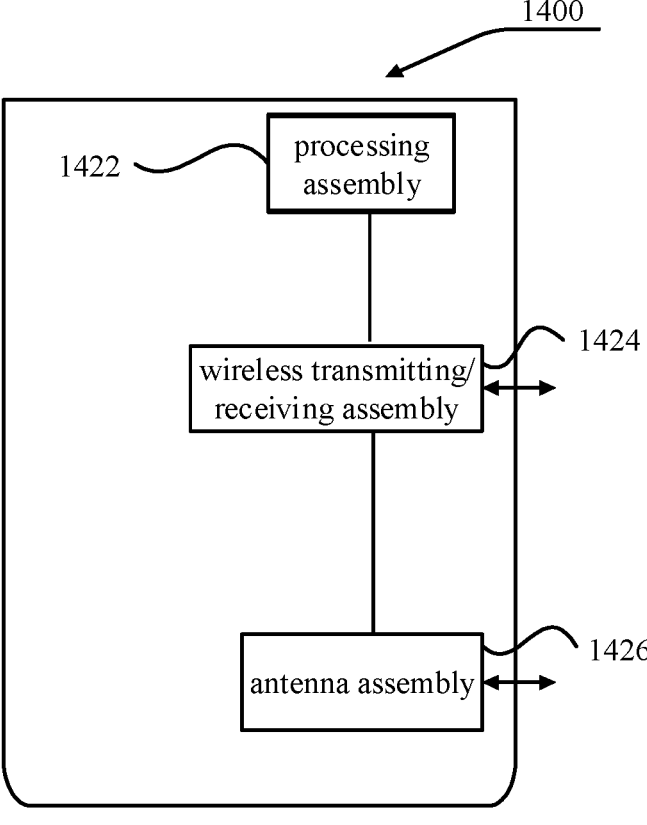
FIG. 14 is a schematic block diagram of a capability sending and/or receiving apparatus according to an example of the present disclosure.

As shown in FIG. 14, FIG. 14 is a schematic block diagram of a capability sending and/or receiving apparatus 1400 according to an example of the present disclosure. The apparatus 1400 may be provided as a base station. In one example, the base station may be a first base station and/or a second base station. Referring to FIG. 14, the apparatus 1400 includes a processing assembly 1422, a wireless transmitting/receiving assembly 1424, an antenna assembly 1426, and a signal processing portion specific to the wireless interface. The processing assembly 1422 may further include one or more processors. One of the processors of processing assembly 1422 may be configured to implement the capability sending method and/or capability receiving method described in any of the above examples.

Figure 15:
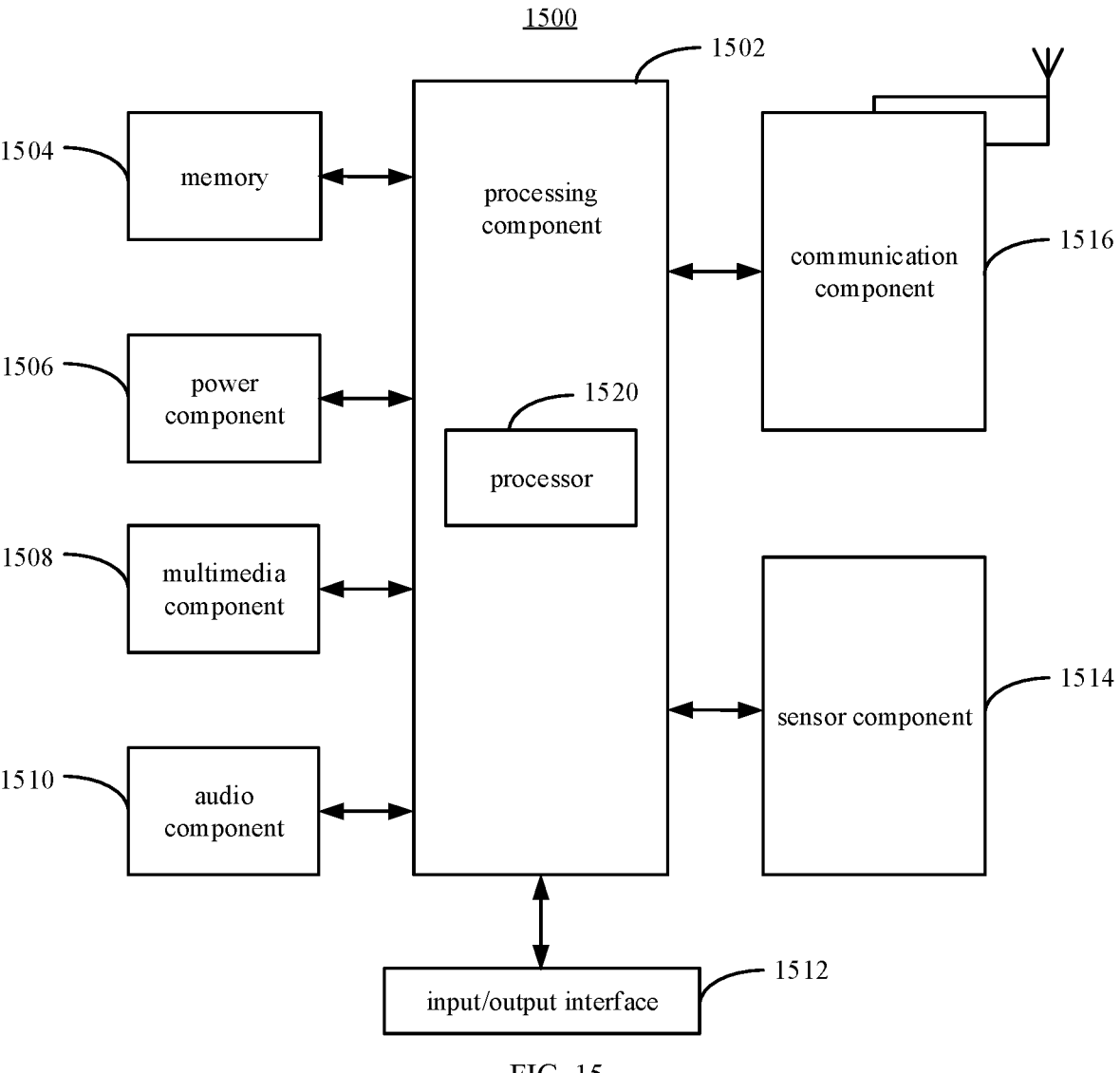
FIG. 15 is a schematic block diagram of a capability sending apparatus according to an example of the present disclosure.

FIG. 15 is a schematic block diagram of a capability sending apparatus 1500 according to an example of the present disclosure. For example, the apparatus 1500 may be a a cell phone, a computer, a digital broadcast terminal, a message sending and receiving device, a gaming console, a tablet device, a medical device, a fitness device, a personal digital assistant, etc.

Referring to FIG. 15, the apparatus 1500 may include one or more of the following components: a processing component 1502, a memory 1504, a power component 1506, a multimedia component 1508, an audio component 1510, an input/output (I/O) interface 1512, a sensor component 1514, and a communication component 1516.

The processing component 1502 typically controls the overall operations of the apparatus 1500, such as the operations associated with display, telephone calls, data communication, camera operations, and recording operations. The processing component 1502 can include one or more processors 1520 to execute instructions to perform all or part of the steps in the above capability sending methods. Moreover, the processing component 1502 can include one or more modules to facilitate the interaction between the processing component 1502 and other components. For example, the processing component 1502 can include a multimedia module to facilitate the interaction between the multimedia component 1508 and the processing component 1502.

The memory 1504 is configured to store various types of data to support the operation of the apparatus 1500. Examples of such data include instructions, contact data, phone book data, messages, pictures, videos, and the like for any application or method operated on the apparatus 1500. The memory 1504 can be implemented by any type of volatile or non-volatile storage device, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic or optical disk.

The power component 1506 provides power to various components of the apparatus 1500. The power component 1506 can include a power management system, one or more power sources, and other components associated with the generation, management, and distribution of power in the apparatus 1500.

The multimedia component 1508 includes a screen providing an output interface between the apparatus 1500 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense the boundaries of the touch or swipe action, but also detect the duration and pressure associated with the touch or swipe action. In some examples, the multimedia component 1508 includes a front camera and/or a rear camera. When the apparatus 1500 is in an operation mode, such as a photographing mode or a video mode, the front camera and/or the rear camera can receive external multimedia data. Each of the front camera and the rear camera may be a fixed optical lens system or have focus and optical zoom capability.

The audio component 1510 is configured to output and/or input an audio signal. For example, the audio component 1510 includes a microphone (MIC) configured to receive an external audio signal when the apparatus 1500 is in an operation mode, such as a call mode, a recording mode, and a voice recognition mode. The received audio signal may be further stored in the memory 1504 or sent via the communication component 1516. In some examples, the audio component 1510 also includes a speaker for outputting the audio signal.

The I/O interface 1512 provides an interface between the processing component 1502 and peripheral interface modules, such as a keyboard, a click wheel, buttons, and the like. These buttons may include, but not limited to, a home button, a volume button, a starting button, and a locking button.

The sensor component 1514 includes one or more sensors for providing state assessments of various aspects of the apparatus 1500. For example, the sensor component 1514 can detect an open/closed state of the apparatus 1500, relative positioning of components, such as the display and the keypad of the apparatus 1500. The sensor component 1514 can also detect a change in position of one component of the apparatus 1500 or the apparatus 1500, the presence or absence of user contact with the apparatus 1500, an orientation, or an acceleration/deceleration of the apparatus 1500, and a change in temperature of the apparatus 1500. The sensor component 1514 can also include a proximity sensor configured to detect the presence of nearby objects without any physical contact. The sensor component 1514 can also include a light sensor, such as a CMOS or CCD image sensor, configured to use in imaging applications. In some examples, the sensor component 1514 can also include an accelerometer sensor, a gyroscope sensor, a magnetic sensor, a pressure sensor, or a temperature sensor. The communication component 1516 is configured to facilitate communication between the apparatus 1500 and other devices by wired or wireless manners. The apparatus 1500 can access a wireless network based on a communication standard, such as Wi-Fi, 2G or 3G, 4G LTE, 5G NR, or a combination thereof. In an example, the communication component 1516 receives broadcast signals or broadcast association information from an external broadcast management system via a broadcast channel. In an example, the communication component 1516 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth™ (BT) wireless communication technology and other technologies.

In an example, the apparatus 1500 may be implemented with one or more application specific integrated circuits (ASICs), digital signal processors (DSPs), digital signal processing devices (DSPDs), programmable logic devices (PLDs), field programmable Gate arrays (FPGAs), controllers, microcontrollers, microprocessors or other electronic components, to perform the above capability sending methods.

In an example, there is also provided a non-transitory computer-readable storage medium including instructions, such as a memory 1504 including instructions executable by the processor 1520 of the apparatus 1500 to perform the above capability sending methods. For example, the non-transitory computer readable storage medium may be a ROM, a random access memory (RAM), a CD-ROM, a magnetic tape, a floppy disc, and an optical data storage device, or the like.

Other implementations of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and examples are illustrative only, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

It is noted that in this document, relationship terms such as first and second are used only to distinguish one entity or operation from another entity or operation, and do not necessarily require or imply any such actual relationship or order between these entities or operations. The term "including", "including" or any other variation thereof, is intended to cover non-exclusive inclusion, so that a process, method, article, or device that includes a set of elements includes not only those elements, but also other elements not explicitly listed, or also include elements that are inherent to such process, method, article, device. Without further limitation, the elements defined by the statement "including a" do not preclude the existence of additional identical elements in the process, method, article, or device that include the elements.

The methods and apparatuses provided by the examples of the present disclosure have been described in detail above, and the principles and examples of the present disclosure have been described herein by applying specific examples. The description of the above examples is only used to help understand the methods and core ideas of the present disclosure. Meanwhile, to those of ordinary skill in the art, according to the idea of the present disclosure, there will be changes in the specific example and the scope of application. In summary, the contents of this specification should not be understood as limiting the present disclosure.

What is claimed is:

1. A capability sending method, applied to a first base station, the method comprising:
sending capability information of a terminal to a second base station;
acquiring capability information of the second base station solving a multi-card problem; and
sending the capability information for solving the multi-card problem to the terminal.

2. The method according to claim 1, wherein the terminal is a terminal to be switched from the first base station to the second base station.

3. The method according to claim 1, further comprising:
acquiring the capability information of the terminal.

4. The method according to claim 3, wherein acquiring the capability information of the terminal comprises:
acquiring the capability information from the terminal; or
acquiring the capability information of the terminal from a core network.

5. The method according to claim 2, wherein sending the capability information to the second base station comprises:
sending to the second base station a switching request for the terminal to switch from the first base station to the second base station, wherein the switching request carries the capability information, wherein the capability information is used for the second base station to determine whether to accept the switching request for the terminal to switch from the first base station to the second base station.

6. The method according to claim 1, wherein the capability information comprises at least one of:
a capability of the terminal supporting multiple cards;
a capability of the terminal reporting the multi-card problem.

7. The method according to claim 6, further comprising:
receiving a reason for the second base station to reject the switching request for the terminal to switch from the first base station to the second base station, wherein the reason comprises: a capability of the terminal reporting the multi-card problem not matching with capability information of the second base station solving the multi-card problem.

8. A capability receiving method, applied to a second base station, the method comprising:
acquiring capability information of a terminal from a first base station; and
sending capability information of the second base station solving a multi-card problem to the first base station, for the first base station to send the capability information for solving the multi-card problem to the terminal.

9. The method according to claim 8, wherein the terminal is a terminal to be switched from the first base station to the second base station.

10. The method according to claim 9, wherein acquiring capability information of the terminal from the first base station comprises:
receiving a switching request for the terminal to switch from the first base station to the second base station sent by the first base station, wherein the switching request carries the capability information.

11. The method according to claim 9, further comprising:
determining, based on the capability information, whether to accept a switching request for the terminal to switch from the first base station to the second base station.

12. The method according to claim 8, wherein the capability information comprises at least one of:
a capability of the terminal supporting multiple cards;
a capability of the terminal reporting the multi-card problem.

13. The method according to claim 12, wherein determining, based on the capability information, whether to accept the switching request for the terminal to switch from the first base station to the second base station comprises:
accepting the switching request in response to determining that the terminal supports multiple cards and the second base station supports solving the multi-card problem; or
rejecting the switching request in response to determining that the terminal supports multiple cards and the second base station does not support solving the multi-card problem.

14. The method according to claim 12, wherein determining, based on the capability information, whether to accept the switching request for the terminal to switch from the first base station to the second base station comprises:
accepting the switching request in response to determining that the capability of the terminal reporting the multi-card problem matches with capability information of the second base station solving the multi-card problem; or
rejecting the switching request in response to determining that the capability of the terminal reporting the multi-card problem does not match with capability information of the second base station solving the multi-card problem.

15. The method according to claim 14, wherein
the capability of the terminal reporting the multi-card problem matching with capability information of the second base station solving the multi-card problem comprises: the capability of the terminal reporting the multi-card problem overlapping with the capability of the second base station solving the multi-card problem; or
the capability of the terminal reporting the multi-card problem not matching with capability information of the second base station solving the multi-card problem comprises: the capability of the terminal reporting the multi-card problem completely not overlapping with the capability of the second base station solving the multi-card problem.

16. The method according to claim 12, further comprising:
sending a reason for rejecting the switching request to the first base station, wherein the reason comprises: a capability of the terminal reporting the multi-card problem not matching with capability information of the second base station solving the multi-card problem.

17. A capability sending method, applied to a terminal, the method comprising:

sending capability information of the terminal to a first base station, for the first base station to send the capability information to a second base station; and receiving capability information for the second base station to solve a multi-card problem sent by the first base station.

* * * * *